June 18, 1929.  S. G. SEVERSON  1,717,415
WIRELESS CORN PLANTER
Filed Feb. 17, 1927   3 Sheets-Sheet 3
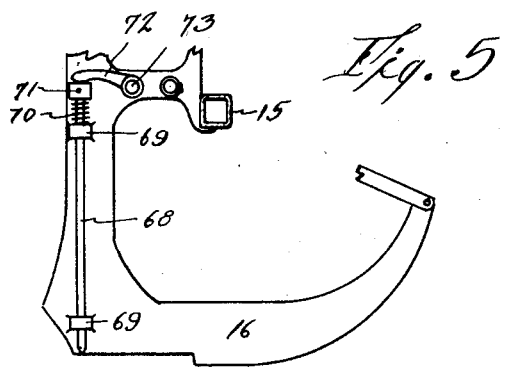
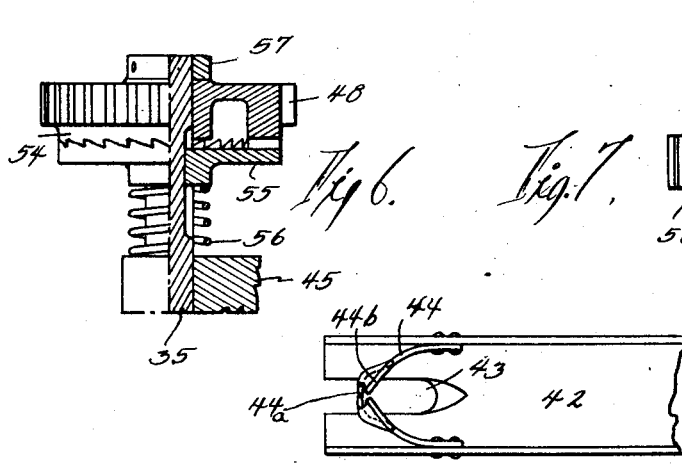
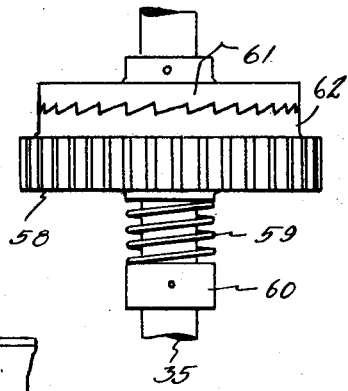
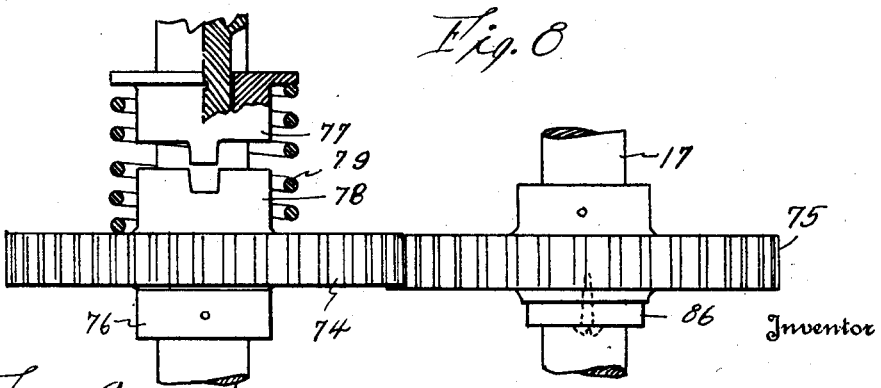
Inventor
Severt G. Severson
By
Lynn W. Latta   Attorney Patented June 18, 1929.

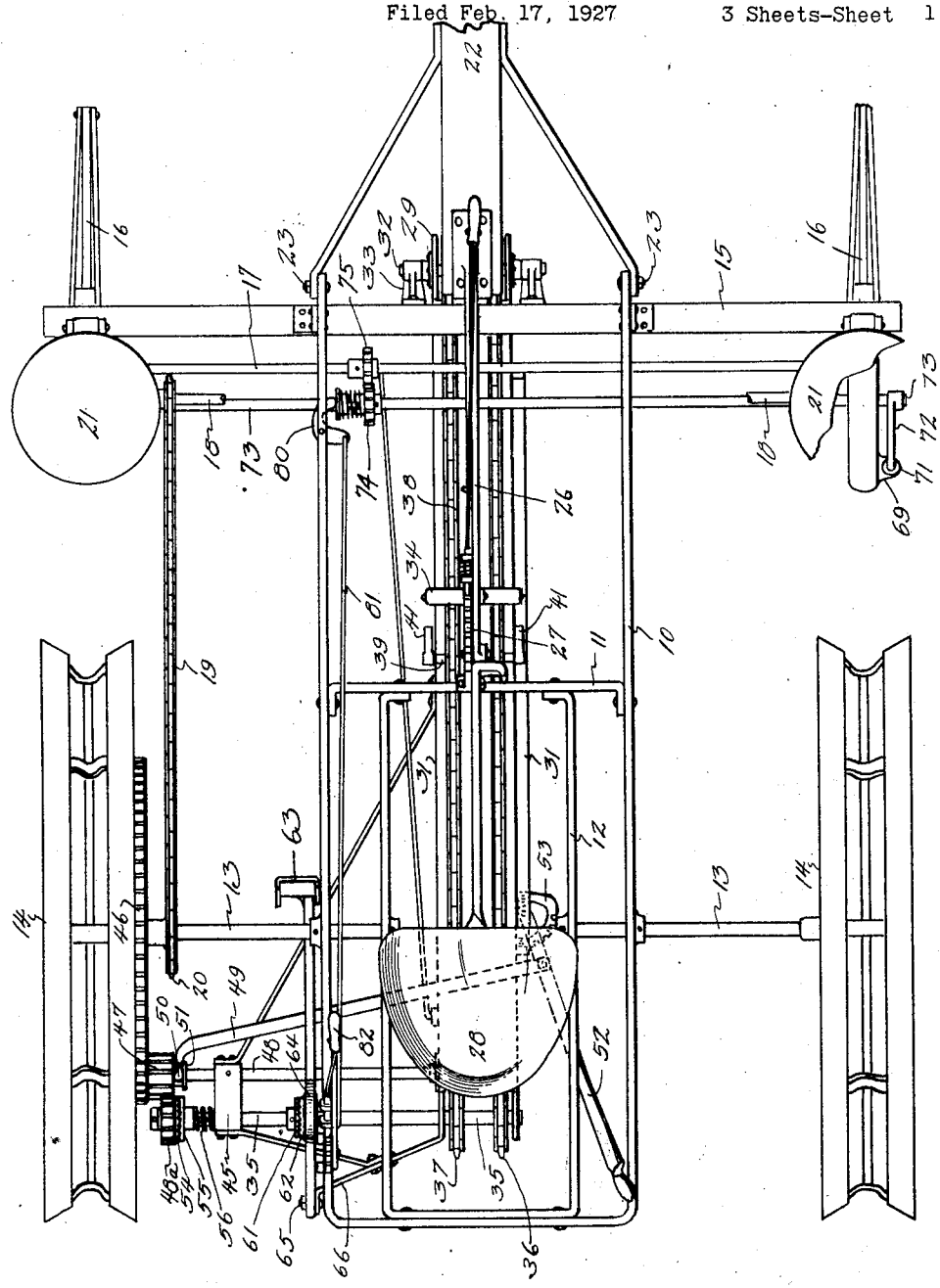

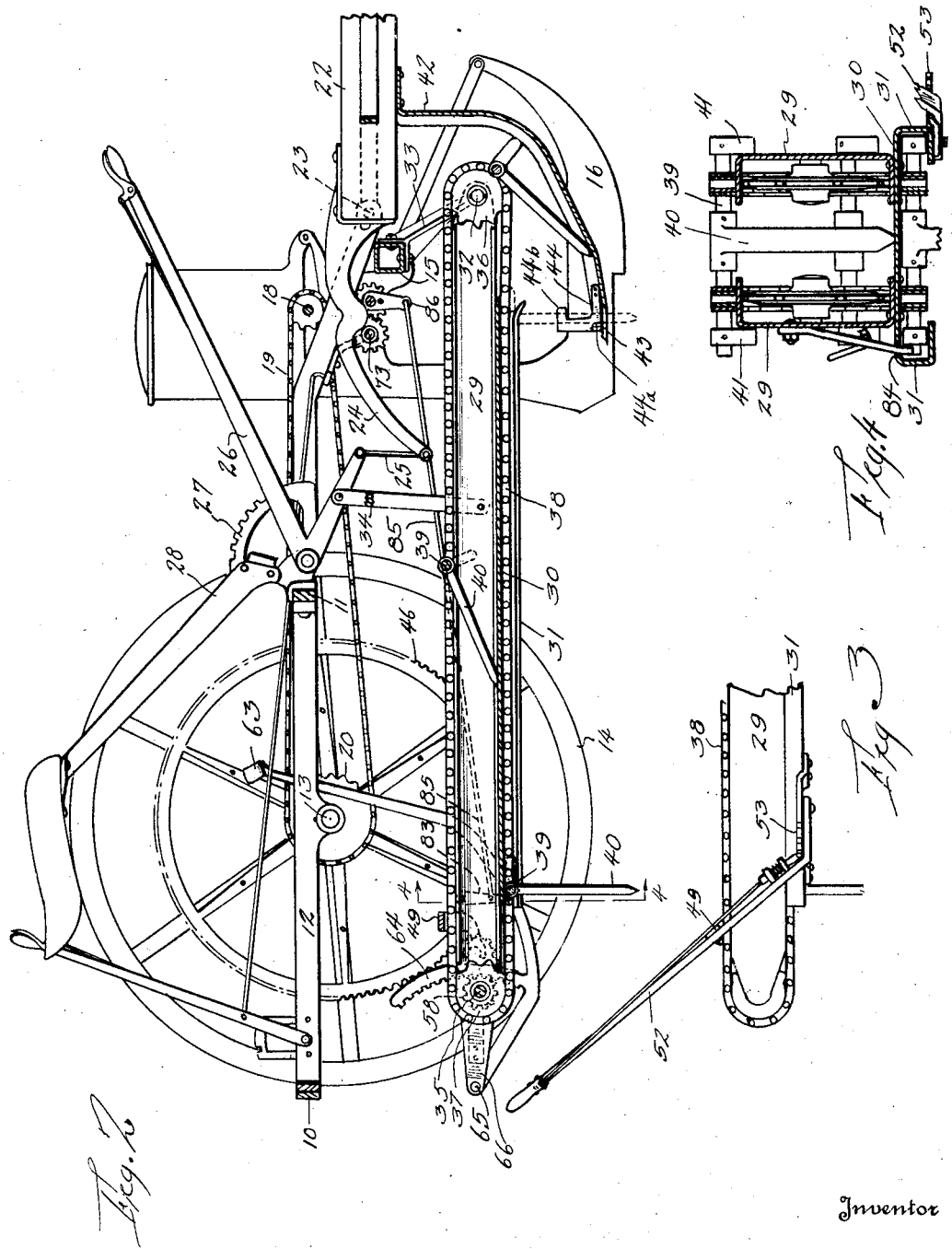

1,717,415

UNITED STATES PATENT OFFICE.

SEVERT G. SEVERSON, OF SOUTH SIOUX CITY, NEBRASKA.

WIRELESS CORN PLANTER.

Application filed February 17, 1927. Serial No. 168,950.

My invention relates to a corn planter of the type designed to do away with the ordinary check row wire now in use. It is my object to provide such a planter, (ordinarily called a "wireless planter") in which the power for actuating the dropping mechanism is derived partly from the wheels of the planter and partly from an independently driven and controlled unit which I will term the "control unit". More specifically, it is my aim to provide a control unit, (including an endless chain element) normally driven in parallel relation to the general contour of the ground over which the planter is travelling and linked to the ground by projecting spikes in such a way that its lineal speed will be controlled by said spikes to be constantly equal to the rate of forward travel of the planter relative to the ground, unaffected by up and down movement of the planter.

Where the dropping mechanism is actuated directly from the planter wheels, the up and down movement of the planter varies the distance of the center of the wheels from the ground, and as the radius is thereby increased, the ratio of the rotational speed to the forward travel of the planter will be thereby decreased and this variation transmitted to the measuring mechanism. I obtain a much higher degree of accuracy by controlling the measuring or dropping mechanism directly from an element which is linked to the ground in such a way that it can not slip and in such a way that its lineal speed, exactly equal to that of the planter relative to the ground, it transmitted in unvarying ratio to the dropping mechanism.

In addition to the driving of the control unit by direct contact with the ground, I provide a positive drive from the planter wheels, tending to drive the endless chain element at a slightly lesser speed than its normal speed, the power from the wheels being transmitted to the control unit through a device which allows the endless chain element to constantly slip ahead of the wheel drive.

By thus providing an auxiliary drive for the control unit, its endless chain element will be driven, should its endless chain element lose its positive engagement with the ground through extraordinary conditions.

Other objects of the invention are to provide means for raising the planter shoes and the control unit, means for marking the planted hills at the will of the operator, means for releasing the driving engagement with the wheels when desirable, and an auxiliary control device for setting the endless chain element ahead.

With these and other objects in view, my invention consists in the combination and arrangement of the various parts of my device, whereby the objects contemplated are attained, as hereinafter more fully set forth, pointed out in my claims and illustrated in the accompanying drawings, in which:

Fig. 1 is a plan view of the planter.

Fig. 2 is a central, longitudinal, sectional view thereof.

Fig. 3 is a detail elevation of the rear portion of the control unit.

Fig. 4 is a transverse, sectional view of the control unit taken on the line 4—4 of Fig. 2.

Fig. 5 is a side elevation of the planter shoe illustrating a marking device.

Fig. 6 is a detail view of the ratchet connection between the wheel drive and control unit.

Fig. 7 is a detail view of a portion of the auxiliary control mechanism.

Fig. 8 is a detail plan view of the spike guide.

Fig. 9 is a detail view of the marker clutch.

I have used the reference character 10 to indicate generally the ordinary U shaped longitudinal planter frame. To this frame, intermediate its ends, is secured a cross member 11 and an inner U shaped frame 12 is secured between the cross member 11 and the frame 10 in a longitudinal direction. Between the parallel portions of the frames 10 and 12 are secured the two stub axles 13 upon which are journalled the planter wheels 14.

Secured to the forward ends of the frame 10 is the forward cross frame member 15 which carries the usual planter shoes 16. Journalled between the shoes 16 is the ordinary dropper shaft 17 which controls the upper seed gate (not shown) and the ordinary plate shaft 18, driven by a chain 19 from a sprocket 20 secured to the wheel 14. The hoppers are shown at 21.

The rear portion of the tongue truck is shown at 22, being hinged at 23 to the frame, and provided with a lever 24, extending rearwardly of its hinged axis and linked by means of a rod 25 to the arm of the bell crank lever 26, co-acting with a sector 27, carrying the usual seat 28 and secured to the cross member 11.

The foregoing parts are the ordinary construction and form no part of my invention save in their relationship to the control unit and other features which I will describe.

The control unit has a longitudinally extending frame pivoted at its forward end to the planter frame. The control frame comprises a pair of side channel members 29 to the lower flanges of which is secured a plate 30, bent back upon itself at either side to form the opposed guideways 31. At the forward ends the chambers 9 are pivoted upon studs 32 secured in brackets 33 depending from the forward cross frame member 15. Intermediate its ends, the control unit frame is supported by links 34 pivoted to the bell crank lever 26, nearer its fulcrum than the rod 25. The parts are so arranged that as the lever 26 is lifted upon, the planter shoes 16 are thereby lifted from the ground in the ordinary manner and the control unit frame will at the same time be lifted also.

Upon the studs 32 and upon a shaft 35 journalled between the rear ends of the channel members 29 are sprockets 36 and 37 respectively. Between the sprockets travel endless chains 38 and the pairs of sprockets are so spaced that the upper reaches of the chains 38 will rest upon the upper flanges of the channels 29.

Between the chains 38 are journalled a plurality of spike shafts 39 to which are secured spikes 40 of such lengths that when depending vertically from the lower reaches of the chains, they will enter the ground to a depth of several inches, the control unit being in its normal position as shown. The shafts 39 extend outwardly beyond the chains 38 and are provided with spike arms 41 secured thereto at right angles to the spikes 40 and just clearing the sides of the channels 29.

The guideways 31 are adapted to receive the arms 41 during a portion of the travel of the spikes below the control unit frame and to maintain the spikes in a rigidly vertical position relative to the control unit frame.

Before proceeding further, it may be stated that the spikes are arranged a distance apart equal to the normal distance between two hills of corn and are adapted to be moved past a trip lever so as to successively actuate the dropping mechanism at proper intervals. The engagement of the spikes with the ground determines at all times their proper position relative to the actuating mechanism for dropping the seed and it will be seen that as the machine progresses forwardly and the spikes are planted one at a time in the ground, exactly the required distance ahead of the preceding spike, that the dropping mechanism will be actuated at exactly the proper interval.

In order to provide means for planting the spikes, they are carried while traversing the upper reaches of the chains, in a reclined position as shown, dragging against the upper surface of the plate 30, and are thence dropped at the end of the plate onto the spike guide shoe 42. As the shafts 39 start rearwardly, a spike will be pushed to the end of a guide where its point will enter the slot 43 and be detained by a pair of spring arms 44, hooked together at their ends as at 44$^a$ when the upper end of the spike has been moved forwardly to bring the spike to a vertical position, the intermediate portion of the spike will engage the inclined cam plates 44$^b$ which are formed as part of the spring members 44 and will spread the spring members to a point where the hooked ends 44$^a$ will release the stake. During the interval of time while the stake is being uprighted, its lower end will drag in the ground, causing the dirt ahead of the stake to peak closely so that the stake will not slip when it is functioning to move the said dropping mechanism. When the spike has thus been set, the arms 41 will enter their guideways and thereby render the spike's vertical position secure. When the spike has neared the end of its rearward path, its arms are freed from the guideways 31 so that as it is drawn upwardly from the ground, it may be allowed to drag to an inclined position to facilitate removal.

The shaft 35 extends laterally toward one of the wheels 14 and is journalled in its outer end in a bearing block 45, carried by the control unit frame as shown in Fig. 1. The wheel 14 is provided with a ring gear 46 which normally meshes with an idler pinion 47 freely slidable and rotatable upon a shaft 48 secured between the block 45 and the control unit frame. The idler pinion 47 is of greater width than the ring gear 46 and meshes also with a pinion 48$^a$ on the drive shaft 35, the pinion 48$^a$ being in a different plane than that of the gear 46.

A gear shift link 49, having a yoke 50 embracing the collar 51 of the idler pinion 47, is connected at its other end to a gear shift lever as co-acting with a sector 53 on the control unit frame (Fig. 3).

By moving the lever 52 away from the center of the machine, the pinion 47 will be slid on the shaft 48 away from mesh with the gear 46.

The pinion 48$^a$ is loosely mounted on the shaft 35 and has a clutch or ratchet plate 54 co-acting with a ratchet element 55 splined to the shaft 35 as shown in Fig. 6. A spring 56, compressed between the bearing block 45 and the ratchet element 55, yieldingly maintains the two ratchet members in engagement. A thrust collar 47 retains the pinion 48 against longitudinal movement.

It will now be seen that as the wheels 14 rotate responsive to the forward motion of the planter, the pinion 48 will be driven in the same direction as the rotation of the wheels, and, the teeth of the ratch 54 being directed properly, the pinion will tend to transmit rotation in the same direction to the shaft 35. However, the spikes 40 are so arranged, one of the spikes will be in the ground at all times and the chains 38 will be driven in the same direction by the engagement of the spikes, a trifle faster than the rotation transmitted from the pinion 48. Consequently, the ratch element 55 will normally rotate ahead of the ratchet element 54 against the pressure of the spring 56. Should either of said spikes fail to, at any time, grip the ground, the pinion 48 will immediately catch the shaft 35 and drive it forwardly at approximately the right speed until the next spike has been planted.

Should the control unit at any time fall behind in the position of spikes, it may be speeded up by use of the auxiliary control device which I will now describe.

A pinion 58 is loosely mounted upon the shaft 35 between a spring 59, retained by a collar 60, and a ratchet plate 61, secured to the shaft and co-acting with a ratchet plate 62 formed on the pinion 58. A pedal 53, having a rack portion 64 meshing with the pinion 58, is pivoted at 65 to an extended portion 66 of one of the frame members 29. Depression of the pedal 63 will rotate the pinion 58 in the direction of travel of shaft 35, and, through the ratchet members 62 and 61, transmit rotation to the shaft. Normally, the ratchet member 61 will rotate away from the ratchet member 62.

The pedal 63 is used for setting the mechanism when a new row is to be started and in order to determine where the first spike shall be planted, I provide a marking mechanism comprising a marker rod 68, mounted in lugs 69 on the shoe 16, normally retained in an inoperative position by a spring 70 compressed between the upper lug 69 and a collar 71 on the rod 68 and depressed simultaneously with the dropping of seed by a lever 72 secured to the projecting end of the marker shaft 73.

The marker shaft 73 is geared to the dropper shaft 17 by means of a pinion 74 loosely mounted on the shaft 73 and meshing with a pinion 75 fixed to the shaft 17. Ordinarily it is desirable to release the marker so that it will not operate and to this end the pinion 74 is loosely mounted on the shaft 73 between a collar 76 and a clutch element 77, adapted to co-act with a clutch element 78 formed on the pinion 74 being normally held out of engagement, therewith, by a spring 79. The clutch element 77 is splined to the shaft 73 as shown in Fig. 9 and is actuated by a bell crank lever 80, pivoted to the frame 10 and linked by means of a rod 81 to the clutch lever 82. Rearward movement of the lever 82 will cause the bell crank 80 to move the clutch element 77 into engagement with the pinion 74, connecting it to the shaft 73 so as to transmit movement from the shaft 17 to the shaft 73.

The shaft 17 is actuated by means of a trip lever 83 (Figs. 2 and 4) pivoted to a frame member 29, extending through a slot 84 in the plate 30, across the path of movement of the ends of the spike shafts 39. The trip lever 83 is connected by means of a rod 85 to an arm 86, secured to the pinion 75. It will now be seen that as each spike moves past the trip lever, the seed dropping mechanism will be actuated and when desired the marking mechanism will be coincidently actuated.

When turning at the end of a field the entire planting mechanism may be raised from the ground, re-set at the beginning of the next row in accordance with the marks left by the marker rod, and thence again lowered. In raising the control unit the pinion 47 is unmeshed so that it may swing upwardly.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a corn planter, a planter frame, supported on wheels, dropping mechanism including a dropper shaft, a lever on said shaft, a control unit including a frame hinged at its forward end to the planter frame, a pair of endless chain elements supported on sprockets carried by said control unit frame, spikes carried between said chain elements and adapted to be planted in the ground as the planter moves forwardly, a trip lever carried by the control unit frame and linked to the dropper shaft lever, said trip lever having a portion interposed in the path of travel of an element carried by one of the chain elements, a shaft carried by the control unit frame and carrying two of said sprockets, said shaft extending toward one of the wheels, a ring gear secured to said wheel, an idler pinion carried by the control unit frame and slidable into and out of mesh with the ring gear, a driven pinion mounted loosely on the shaft and meshing with the idler pinion, and ratchet means coupling said driven pinion to the shaft and allowing the shaft to rotate ahead of the driven pinion.

2. In a corn planter, a planter frame, supported on wheels, dropping mechanism including a dropper shaft, a lever on said shaft, a control unit including a frame hinged at its forward end to the planter frame, a pair of endless chain elements supported on sprockets carried by said control unit frame, spikes carried between said chain elements and adapted to be planted in the ground as the planter moves forwardly, a trip lever carried by the control unit frame and linked to the dropper shaft lever, said trip lever having a portion interposed in the path of travel of an element carried by one of the chain elements, a shaft carried by the control unit frame, said shaft carrying two of said sprockets and having an auxiliary drive connection with a planter wheel including a ratchet coupling, allowing the shaft to rotate ahead of said auxiliary drive.

3. In a corn planter, a planter frame supported on wheels, dropping mechanism, a control unit including a frame hinged to the planter frame, endless chain elements traveling on sprockets mounted on said control unit frame, spikes pivotally mounted between said endless chain elements and adapted to be planted in the ground as the planter moves forwardly, means interposed in the path of a projecting element on an endless chain to transmit intermittent movement to the dropping mechanism, guide elements on said control unit frame adapted to engage a projecting element on each spike during its engagement with the ground to maintain said spike in an upright position, a shoe positioned to receive the spikes, just prior to their contact with the ground and to retard the movement of their contact until said spikes have reached a predetermined position relative to the machine.

4. In a corn planter, a planter frame supported on wheels, dropping mechanism, a control unit including a frame hinged to the planter frame, endless chain elements traveling on sprockets mounted on said control unit frame, spikes pivotally mounted between said endless chain elements and adapted to be planted in the ground as the planter moves forwardly, means interposed in the path of a projecting element on an endless chain to transmit intermittent movement to the dropping mechanism, guide elements on said control unit frame adapted to engage a projecting element on each spike during its engagement with the ground to maintain said spike in an upright position, a shoe positioned to receive the spikes just prior to their contact with the ground and to retard the movement of their contact until said spikes have reached a predetermined position relative to the machine, and resilient means carried by said shoe to engage the spikes and retain them at their lower ends in a position of momentarily arrested movement in a longitudinal direction until they have been partially implanted in the ground.

Signed this 14th day of February, 1927, at Sioux City, in the county of Woodbury and State of Iowa.

SEVERT G. SEVERSON.